United States Patent [19]  [11] 4,184,795
Medlin  [45] Jan. 22, 1980

[54] BORING TOOL

[76] Inventor: Glenn D. Medlin, P.O. Box, Mt. Pleasant, N.C. 28124

[21] Appl. No.: 882,365

[22] Filed: Mar. 1, 1978

[51] Int. Cl.² .............................................. B23B 45/14
[52] U.S. Cl. ..................................... 408/127; 173/163
[58] Field of Search ................. 408/127, 85, 223, 114; 173/29, 46, 163

[56] References Cited

U.S. PATENT DOCUMENTS

| 583,922 | 6/1897 | McClellan | 408/127 X |
| 2,106,937 | 2/1938 | Torbert, Jr. | 408/127 |
| 2,333,025 | 10/1943 | Mayer | 408/127 X |
| 2,381,102 | 8/1945 | Boyd | 408/127 X |
| 2,711,199 | 6/1955 | Salsbery | 408/127 X |
| 3,006,223 | 10/1961 | Broussard | 408/85 |
| 3,700,347 | 10/1972 | Nanne | 408/127 X |

FOREIGN PATENT DOCUMENTS 1361446 4/1964 France ................................... 408/127

Primary Examiner—Z. R. Bilinsky
Attorney, Agent, or Firm—Peck & Peck

[57] ABSTRACT

A boring tool specifically designed for operation in a limited space consisting of an elongated tubular handle in which a drive shaft operates, power means on one end of said handle for driving said shaft, a universal joint connected to the drive shaft and housed in a bearing case. The case being formed in two parts, one part, the angular imparting part, being formed with a tubular extension and said one part having a flat upper surface and the opposite surface thereof extending angularly with respect thereto, the angle being greater than a 90 degree angle, the universal joint extending through the opposite surface. The other part of the case being attachable to the opposite surface of said one part and assuming the angle thereof. The rotatable shaft from the universal joint extends through the other part for the attachment thereto of a bit which extends at an angle to the elongated handle which is the same as the angle of the opposite surface relative to the elongated handle.

3 Claims, 4 Drawing Figures

BORING TOOL

SUMMARY OF THE INVENTION

A boring tool specifically designed for use in a limited space in an attic of a building, such as a frame dwelling. It is conventional practice for the exterior wall to be of hollow construction consisting of an outside sheathing and an inside wall spaced therefrom leaving a free area between the sheathing and the inside wall. The attic space which is where the tool of this invention is used, as will be fully explained, is between the roof rafters and the ceiling joists. A plate or plates is positioned between and secured to the sheathing and the inside wall and to a ceiling joist. These plates are imperforate and close the top of the exterior wall. It is often desirable to gain access to the free or hollow area between the sheathing and the inside wall so that insulation may be deposited therein, or for instance, electric wiring may be inserted therein.

In order to gain access to this hollow area in the exterior wall for the purposes mentioned above, or for other purposes, the plate or plates which close the top of the hollow area may be bored providing access holes extending therethrough. Since these plates are provided in the exterior wall adjacent to the juncture of the rafters and ceiling joists an accute angle thus occurs and the angular area has presented a severe problem in getting a conventional boring tool into position for boring access holes in the plates.

This problem has been overcome by the unique boring tool which I have devised for boring the proper access holes in the plates which close the upper end of the free or hollow area in the exterior wall and function to support it in proper position. A boring tool for this purpose must be used in this confined and limited area in the attic between the rafters and ceiling joists and my tool is so designed that it functions perfectly and is operable to drill the access holes with relative ease.

The tool consists generally of an elongated handle which rotatively houses the drive shaft and supports any suitable type of power means. At one end the handle mounts what I shall term the "operating head" of the tool which causes the shaft to extend at an angle relative to the handle and also causes the twist bit to operatively extend at an angle to the handle in proper position for drilling an access hole at an angle to the vertical in the plates. The operating head is provided with guide means for insuring to the operator of the tool that it is in proper boring position.

Additional objects and advantages of the present invention will become more readily apparent to those skilled in the art when the following general statements and descriptions are read in the light of the appended drawings.

DETAILED DESCRIPTION

Referring to the accompanying drawings, wherein the boring tool of this invention is illustrated, the numeral 1 has been used to designate an elongated tubular handle, the drive shaft 3 extending through the handle and being powered by any suitable motor 5, which may be an electric motor. The motor 5 is provided on the outer end of the handle and a handle 7 is provided. The connections between the motor and the drive shaft for driving the latter will be apparent to anyone skilled in this discipline and since they form no part of this invention are not shown in detail.

Figure 3:
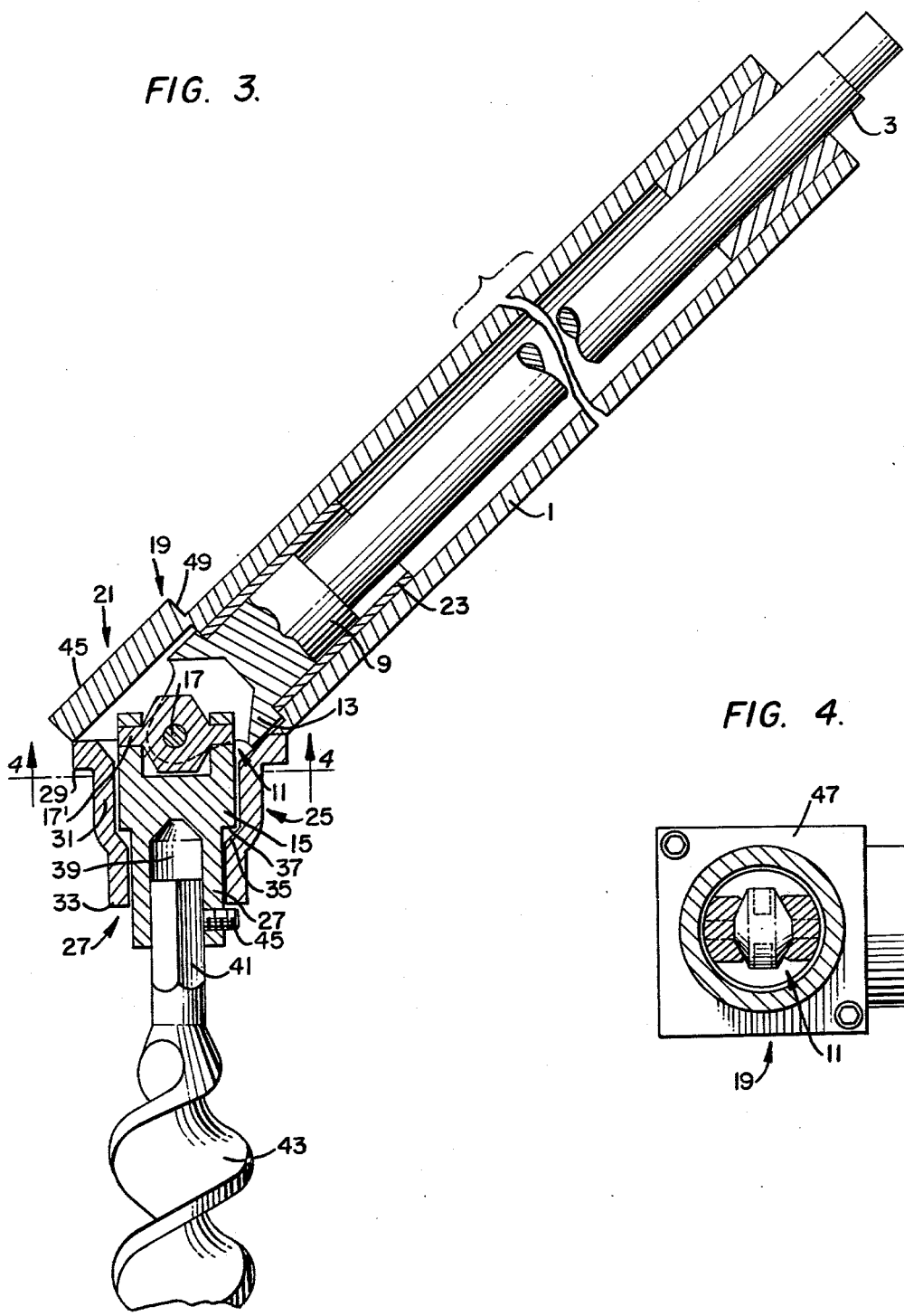
FIG. 3 is a view taken on line 3—3 of FIG. 2.
Figure 4:
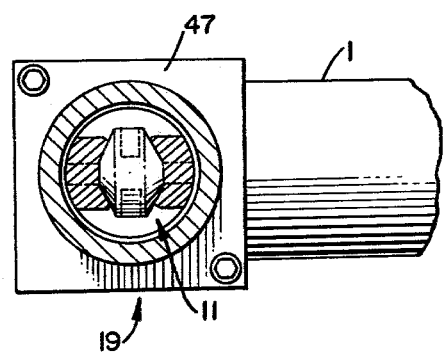
FIG. 4 is a view taken on line 4—4 of FIG. 3.

At its inner end (see FIG. 3) the shaft 3 is provided with a sleeve like element 9 which is fixed thereto and is of greater diameter than that of the major length of the shaft 3 so that element 9 will rotate with the shaft. A universal joint is designated generally by the numeal 11, the universal joint comprising two components, 13 and 15 pivoted together at 17 and 17' so that universal movement between the two components may occur, all in the usual fashion of such joints. The element 9 and the component 13 are integrally formed or otherwise fixed together, so that component 13 will rotate when shaft 3 and element 9 are rotated and of course component 15 will also rotate because of the pivotal connections between the two components.

A bearing case for the universal joint is provided and is designated generally by the numeral 19 and consists of a guide and angularity imparting block designated generally by numeral 21, one function of the block 21 being to cause the twist drill or bit of the tool to extend at the proper angle relative to the handle for its boring operation in the plates, as will become apparent as this description proceeds. Extending rearwardly from block 21 and integrally formed therewith is a tubular extension 23 which operatively receives therethrough the shaft 3 and element 9 and the tubular handle 1 envelopes extension 23. It is to be understood that element 9 and shaft 3 may rotate relative to extension 23.

A further bearing case designated generally by the numeral 25 is provided for the other components of the universal joint and for the drive shaft 27 which extends beyond and is a part of universal component 15 so that it will rotate therewith. The bearing case 25 includes a fastening plate 29, an annular section 31, and a reduced diameter neck 33, all of which are integrally formed. Since neck 33 is of reduced diameter relative to section 31 a shoulder 35 is formed at the juncture of these two parts. Since shaft 27 is of reduced diameter relative to the component 15 a shoulder 37 is formed between the two and when the elements are in operative positions the shoulders 35 and 37 will abut. The shaft 27 is provided with a hexagonal hole 39 therein which receives the hexagonal stem 41 of a twist bit 43 therein. A set screw 45' removably maintains the stem in the hole. The two bearing cases 19 and 25 have been termed the "operating head" of the boring tool.

The block 21 which is formed generally as a right angled triangle comprises a side 45, a hypotenuse 47 and a base 49. In the actual use position the side 45 forms the top and the hypotenuse 47 the forward wall. The side or top 45 is a flat surface, which as will be made clear, provides a visual and/or abutting guide means or guide surface for the tool, which surface is coactive with the roof of the attic for insuring that the tool is properly positioned in the limited attic space so that it will bore the desirable angled access hole in the plates. If desired a lip 51 may extend between hypotenuse 47 and surface 45.

The fastening plate 29 of bearing case 25 is of square configuration and is removably fastened to hypotenuse surface 47 by means of screws 53 and it will now be clear that the angle of surface 47 to handle 1 will be imparted to bearing case 25, shaft 27 and twist drill 43. The angle of surface 47 relative to handle 1 is greater than 90 degrees.

Figure 1:
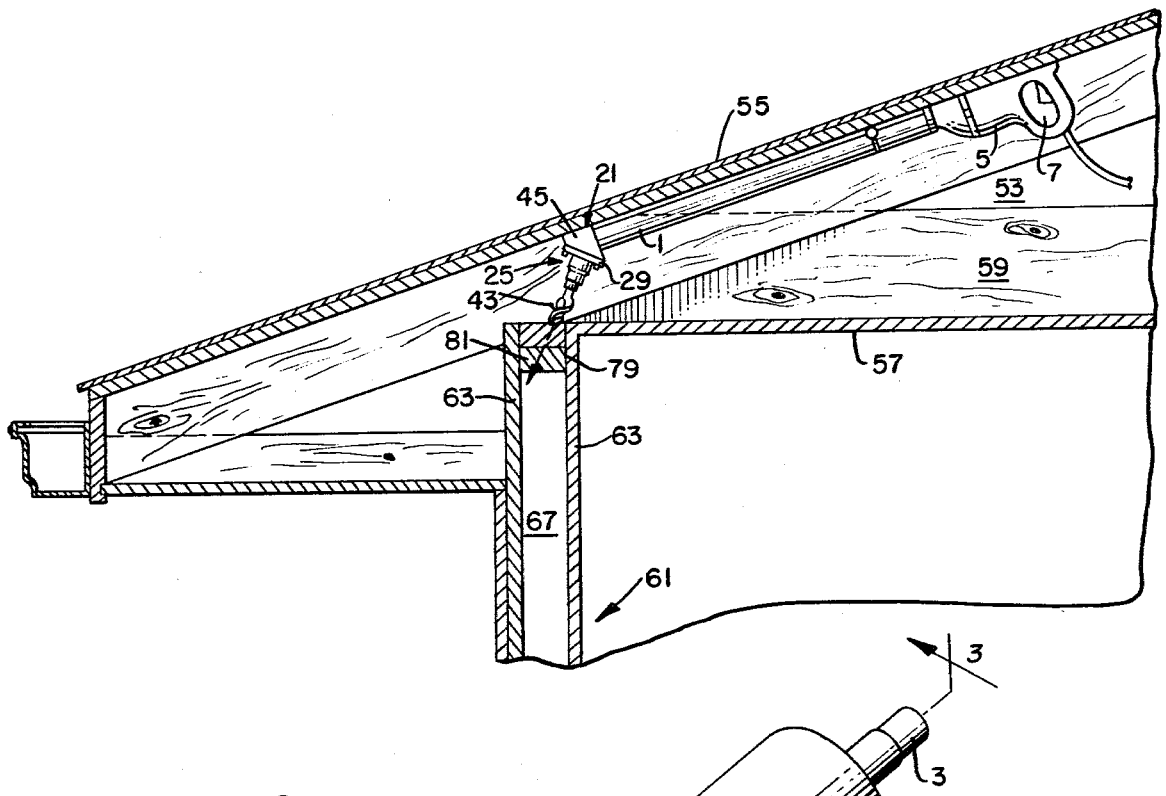
FIG. 1 is a sectional view of the boring tool in operative position in the limited attic space for boring access holes in the plates.
Figure 2:
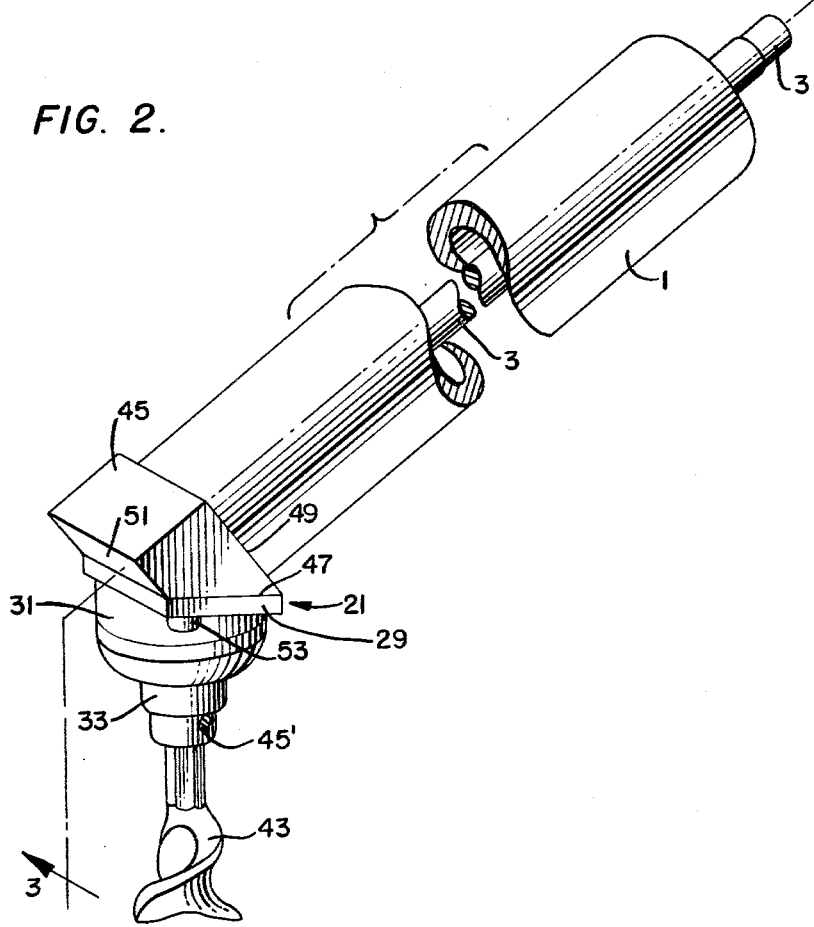
FIG. 2 is a perspective view of the tool.

In FIG. 1 I have illustrated a typical attic area 53 between a roof 55 and ceiling 57, 59 being ceiling joists. The exterior wall of the building is designated in its entirety by the numeral 61 and consists of an outside sheathing 63 and an inner wall 65 spaced therefrom providing a free area 67. A pair of plates 79 are fixed to the exterior wall 61 adjacent the top thereof and to the ceiling joists and effectively close the top of the free area 67. It may be desirable to gain access to the free area by boring access holes in the plates 79. It will be evident from consideration of FIG. 1 that there is very little space between the roof 55 and the top of the plates so that a conventional tool for boring holes in the plates would be inoperable. The angular relationships of the aforementioned and described tool and operating head makes it possible to drill angular access holes 81 in the plates for the disposal of insulation etc. in the free area. In use the tool is positioned as shown in FIG. 1 with the flat surface 45 against the roof so as to properly direct the twist drill 43 toward the plates at an angle thereto. Where the roof pitch is greater than that shown in FIG. 1 the surface 45 may not actually engage the roof and in this instance the operator of the tool visually lines up surface 45 with the roof so that it is substantially parallel with the roof.

The angularity imparting block 21 and its hypotenuse surface 47 will impart the desired angularity to the fastening plate 29 and the twist drill 43 for boring an access hole 81 in the plates 79 which is at an angle to the vertical, the desired angularity of surface 47 relative to handle 1 is greater than 90 degrees. The operator of the tool will be adjacent the motor 7 in a less confined space than the space directly above the plates where the operating head of the tool is.

What is claimed is:

1. A boring tool adapted for operation in a limited attic space to bore angular access holes in plates fixed adjacent to the top of an exterior hollow wall of a building, including an elongated linearly extending handle, a drive shaft rotatably housed in said handle and power means for driving said shaft, an operating head formed in two parts, one of said parts housing one component of a universal joint and said one component being connected to the drive shaft and rotated thereby, the other part of said operating head housing the other component of said universal joint and said other component being operatively connected to and rotated by said one component, said other component provided with a recess therein, a twist bit removably received in said recess, and said one part of said operating head being of generally triangular configuration, an angle imparting means provided on said one part of said operating head, said other part of said operating head being removably affixed to said one part of said operating head, and said angle imparting means imparting to said second part and said twist bit an angularity relative to said handle.

2. A boring tool in accordance with claim 1, wherein said angle imparting means comprises the hypotenuse of said first part of the operating head.

3. A boring tool in accordance with claim 1, wherein said first part includes an uppermost side and said uppermost side is a flat plane surface.

* * * * *